United States Patent Office 3,453,255
Patented July 1, 1969

3,453,255
MONOHALOTRIAZINYL AZO DYESTUFF
Nagib A. Doss, Loudonville, N.Y., assignor to GAF Corporation, New York, N.Y., a corporation of Delaware
No Drawing. Filed Nov. 25, 1966, Ser. No. 596,766
Int. Cl. C09b 29/04; C07c 107/06; D06p 1/02
U.S. Cl. 260—153                                    6 Claims

ABSTRACT OF THE DISCLOSURE

A dyestuff of the formula

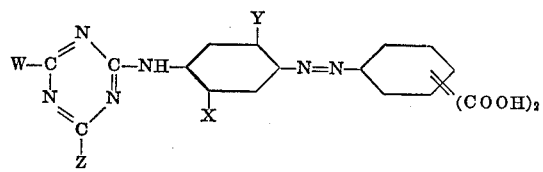

wherein Z is chlorine or bromine; W is amino, monocarboxyphenylamino, dicarboxyphenylamino, monosulfophenylamino, disulfophenylamino, or N-lower alkyl sulfoethylamino, and X and Y are H, methyl or lower alkoxy of 1 to 4 carbon atoms; and a process for dyeing fibrous materials therewith in the presence of an acid-binding agent.

---

A monoazo dyestuff corresponding to one derived from an aminobenzenedicarboxylic acid as diazo component, and a monohalotriazinylaminobenzene as coupling component. A method of dyeing fibrous material therewith in the presence of an acid binding agent.

This invention relates to new monoazo dyestuffs and more particularly to such dyestuffs containing a monohalotriazinyl radical which are highly useful in producing textile dyeings with improved properties.

According to the invention there are provided as new dyestuffs, compounds which in free acid form are represented by the formula:

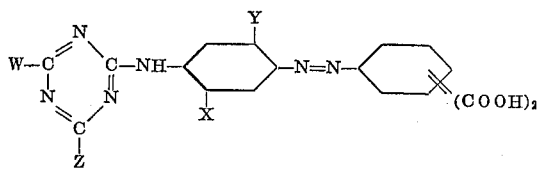

wherein Z is halogen such as chlorine or bromine; W is amino, monocarboxyphenylamino, dicarboxyphenylamino, monosulfophenylamino, disulfophenylamino, or N-loweralkylsulfoethylamino, and X and Y are hydrogen, methyl, or lower alkoxy such as methoxy, ethoxy, propoxy or butoxy. The dyestuffs may be in their free acid form or in the form of their alkali metal, ammonium or organic amine salts.

The dyestuffs of the present invention are characterized by bright yellow shades, unusually high reactivity with fibrous materials containing a reactive or labile hydrogen atom, good build-up, and excellent fastness properties when applied to such fibrous materials, particularly in the presence of an acid binding agent. These dyestuffs may be prepared in any convenient manner. According to one method 1 mole of an aminobenzenedicarboxylic acid is diazotized and coupled in known manner with 1 mole of a coupler of the formula:

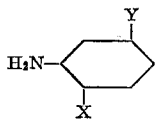

wherein X and Y have the same values as described above. The resulting reaction product is then reacted with 1 mole of cyanuric chloride of cyanuric bromide, desirably at low temperature below about 10° C. in an aqueous medium which may contain a water soluble solvent such as acetone or dioxane or the like and an alkaline agent such as sodium or potassium hydroxide, carbonate, bicarbonate or phosphate or the like. This product is further reacted with 1 mole of ammonia, aminobenzoic acid, aminobenzenedicarboxylic acid, monosulfoaniline, disulfoaniline or methyl taurine preferably in alkaline solution to produce the dyes of this invention.

According to another method for producing these dyestuffs the aminobenzenedicarboxylic acid is diazotized and coupled with the same coupler, and this product in turn is condensed with 1 mole of the primary condensation product of cyanuric chloride or bromide with ammonia, aminobenzoic acid, aminobenzenedicarboxylic acid, monosulfoaniline, disulfoaniline, or methyl taurine.

It is generally preferred to isolate the dyestuffs of the present invention from the medium in which they have been formed at a pH ranging from about 4 to 8.

The dicarboxybenzene moiety is exemplified by 5-aminoisophthalic acid, 2-aminoterephthalic acid and 4-aminophthalic acid and the like.

The coupler moiety is exemplified by aniline, o-toluidine, m-toluidine, o-anisidine, m-anisidine, o- and m-phenetidine, o- and m-propoxyaniline, and o- and m-butoxyaniline.

The W moiety is exemplified by ammonia, N-methyltaurine, o-, m-, and p-aminobenzoic acid, 5-aminoisophthalic acid, 2-aminoterephthalic acid, 4-aminophthalic acid, o-, m-, and p-sulfoaniline, 2,4-disulfoaniline, 2,5-disulfoaniline, 3,5-di-sulfoaniline and the like.

The dyestuff may be applied to the fibrous material at or about room temperature in the presence of an acid binding agent, but elevated temperature is preferred. Application may be in any desired manner, as by continuous or batch methods and by immersion, roller application, padding, spraying, brushing, printing, or the like. The fibrous material may be allowed to remain in the dye-containing medium until the coloring process is completed, or the fibrous material impregnated with the dye-containing medium may be wound on a roller with alternating sheets of polyethylene or similar plastic film and/or the entire roll wrapped in such a film, and the wrapped package held at or above room temperature until completion of the desired reaction between the fiber and the dyestuff. Another method of application is to pad the material with dyestuff solution at about 80° C., dry the material, then impregnate with an alkaline solution and steam for about 60 seconds or more.

The above mentioned acid binding agent may be any alkaline material such as sodium or potassium hydroxide, carbonate, bicarbonate, phosphate or the like and may be applied to the fibrous material prior to, simultaneously with or after application of the dyestuff. The dyestuff is generally applied in aqueous medium containing if desired a water miscible solvent such as acetone, alcohol, dioxane, dimethylformamide, or the like and other known adjuvants such as solution aids like urea and thiodigylcol, migration inhibitors such as cellulose ethers, sodium chloride, sodium sulfate and other salts, wetting agents preferably of the nonionic surface active type, and thickening agents for the production of printing pastes such as methyl cellulose, starch, gum arabic, gum tragacanth, locust bean gum, sodium alginate, and the like. Instead of an alakaline acid binding agent of the type described above, a substance may be employed which liberates an acid binding agent upon subsequent subjection to elevated temperatures. An example of such a substance is sodium trichloroacetate and use of such a substance requires subsequent application of elevated temperatures as by dry heat or steam.

The present dyestuffs have been found to be highly effective for dyeing and printing cellulose fibers of natural or synthetic type such as cotton, linen, wood, paper, regenerated cellulose and the like. As representative of other fibrous materials which may be colored by the present dyestuffs, there may be mentioned natural and synthetic protein fibers such as wool, silk, leather, animal hides and skins, casein and zein, polyamides such as the 6- and 6,6-nylons and polypyrollidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers or graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like and treated as a wound package, running length, fibrous stock, bulk, etc. Further, although this invention has been described for use in the coloration of fibrous material, it will be understood that these dyestuffs may be employed for dyeing other articles including film and sheet material, and other objects of any size, shape and configuration without departing from the spirit and scope of this invention.

The following examples are only illustrative of the present invention and are not to be regarded as limitative. All parts and proportions referred to herein and in the appended claims are by weight unless otherwise specified.

Example 1

90 g. of 5-aminoisophthalic acid is dissolved in 250 cc. of water containing 50 cc. of caustic soda (40% by volume). It is iced to 5° C., acidified with 135 cc. of hydrochloric acid 20° Bé., and then treated at 5–7° C. with 90 cc. of sodium nitrite solution (38.5% by volume). After 30 minutes at 7–9° C., it is treated with 0.5 g. sulfamic acid to destroy excess nitrite, and then with 5–10 g. of sodium bicarbonate to pH 3.5. To this solution is added 100 g. sodium acetate crystals and 55 g. m-toluidine in the form of m-toluidinomethanesulfonic acid. After stirring for 3–4 hours, the pH is adjusted to 11–12 with 60–65 cc. of caustic soda (40% by volume) and then 160 cc. of caustic soda (4% by volume). It is heated to 93–95° C. for 6–8 hours, the pH reduced to 10.5 with 150 cc. of sodium bicarbonate, salted, let cool overnight, filtered and dried.

31.5 g. of this base is stirred and heated to solution in 250 cc. of water. It is then clarified by treatment with Nuchar (activated carbon), and iced to 5–7° C. 19 g. of cyanuric chloride dissolved in 55 g. of acetone, 50 cc. of water and 150 g. of ice is added to the base solution. After 15–20 minutes the pH is gradually raised to 6–6.2 with 60 cc. of soda ash solution (10%).

To the above solution is then added 18 g. of a sodium salt solution of 5-aminoisophthalic acid, the temperature raised to 35° C. and the pH to 7.5–8 with 60 cc. soda ash solution (10%). It is held at 35° C. for 1–2 hours, salted out with 10% by volume salt solution, stirred and cooled, filtered, washed with salt solution (10%) and dried.

The dye has the formula:

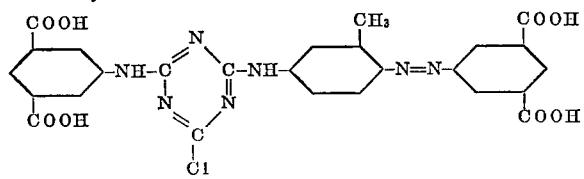

Example 2

90 g. 5-aminoisophalic acid is dissolved in 250 ml. water and 50 ml. sodium hydroxide 40% by volume. It is then treated with 100 ml. hydrochloric acid 20° Bé. and iced to 5–8° C. 90 ml. sodium nitrate solution 38.5% is added and the mixture is held for 45 minutes at 5–8° C. Excess nitrite is destroyed by treatment with sulfamic acid and the acidity is reduced by treatment with 5 g. sodium bicarbonate. To this is then added 70 g. cresidine in 250 ml. water and 50 ml. hydrochloric acid. After 2 minutes it is poured into a solution of 50 g. sodium acetate in 250 ml. water. It is held at 8–12° C. for about 12 hours, made Congo acid with hydrochloric acid, filtered and washed with dilute hydrochloric acid, to give 821 g. paste equivalent to 0.45 mole at 90% yield.

182.5 g. of the above dyestuff is dissolved by heating in 250 ml. water and 35 ml. sodium hydroxide. It is then treated with Nuchar (activated carbon) and filtered. The filtrate is iced to 0–5° C. To this is added 19 g. cyanuric chloride dissolved in 75 ml. acetone. After 45 minutes at this temperature the pH is gradually raised to 6.8 with 50 ml. sodium carbonate solution 12.5%.

25 ml. ammonium hydroxide 26.5% is added to the above solution containing the intermediary nonammoniated dye, and it is allowed to warm to 35° C. and held at this temperature for one hour. It is salted, filtered and dried yielding 64.5 g. of the yellow dye of the formula:

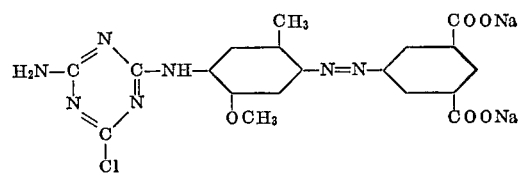

Example 3

0.1 gram mole of the separated nonammoniated intermediary dye of Example 2 is dissolved in 250 ml. water to which is then added 0.1 gram mole sodium anthranilate. It is warmed to and held at 35–40° C. for 2 hours, the pH raised to 6.8 with sodium carbonate, salted, filtered and dried yielding 69 g. of the yellow dye of the formula:

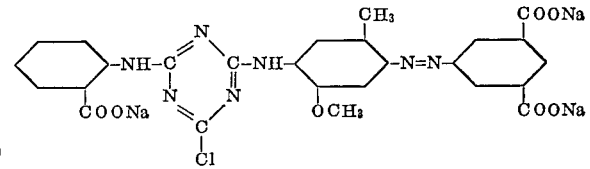

Example 4

0.1 gram mole of 5-aminoisophthalic acid is diazotized and condensed with 0.1 gram mole o-anisidine (as the methane sulfonic acid) and then with cyanuric chloride as in Example 1 to give 57.4 g. dyestuff. This dyestuff is then treated with 25 ml. ammonium hydroxide at 35° C. for 1 hour, salted, filtered and dried to give 67 g. of the yellow dye of the formula:

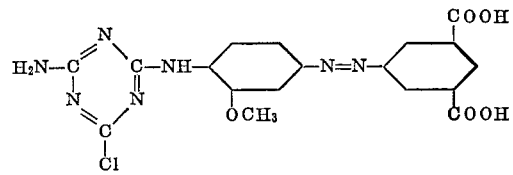

Example 5

The intermediary nonammoniated dye of Example 4 is dissolved in 250 ml. water to which is then added 0.1 mole sodium anthranilate. It is warmed to and held at 35–40° C. for 2 hours, the pH raised to 6.8 with sodium carbonate, salted, filtered and dried to give 69 g. of yellow dye of the formula:

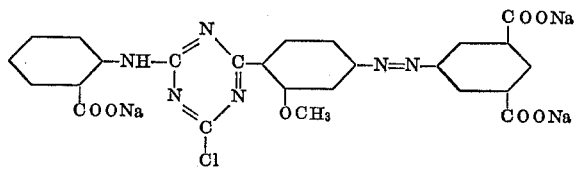

Further azo dyes according to this invention are prepared from diazo and coupling components, treated with cyanuric halide and then with amines in the manner described in the previous examples according to the following table:

TABLE

| Ex. | Diazo | Coupler | Cyanuric halogen | Amine |
|---|---|---|---|---|
| 6 | 5-aminoisophthalic acid | m-Anisidine | Cl | 5-aminoisophthalic acid. |
| 7 | do | o-Anisidine | Cl | Do. |
| 8 | do | 5-methyl-o-anisidine | Cl | Do. |
| 9 | do | 3-butoxyaniline | Cl | Do. |
| 10 | do | m-Toluidine | Br | Do. |
| 11 | 2-aminoterephthalic acid | do | Cl | 2-aminoterephthalic acid. |
| 12 | 4-aminophthalic acid | do | Cl | 4-aminophthalic acid. |
| 13 | 5-aminoisophthalic acid | do | Cl | 5-aminoisophthalic acid. |
| 14 | do | o-Toluidine | Cl | Ammonia. |
| 15 | do | 2,5-dimethoxyaniline | Cl | Anthranilic acid. |
| 16 | do | o-Anisidine | Cl | m-Sulfoaniline. |
| 17 | do | do | Cl | Sulfanilic acid. |
| 18 | do | do | Cl | 2,5-disulfoaniline. |
| 19 | do | do | Cl | 3,5-disulfoaniline. |
| 20 | do | do | Cl | 2,4-disulfoaniline. |

Example 21

3 oz. of the dye of Example 1 is dissolved in a gallon of water. 0.2 oz. Keltex (sodium alginate), 12 oz. urea and 3 oz. soda ash are added. Cotton cloth is padded with this solution and steamed neutral for 5 minutes. A bright yellow coloration is obtained which has excellent fastness properties. Similar results are obtained by like application of other dyestuffs described and exemplified above.

I claim:

1. A dyestuff of the formula

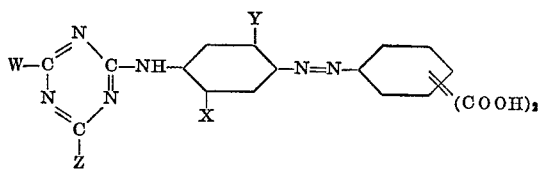

wherein:
Z is chlorine or bromine;
W is amino, monocarboxyphenylamino, dicarboxyphenylamino, monosulfophenylamino, disulfophenylamino, or N-lower alkyl sulfoethylamino, and
X and Y are H, methyl or lower alkoxy of 1 to 4 carbon atoms.

2. A dyestuff as defined in claim 1 wherein Z is chlorine, W is dicarboxyphenylamino, X is H, Y is methyl, and the carboxy groups in the right-hand benzene ring are both substituted in the meta positions relative to the azo bridge.

3. A dyestuff as defined in claim 1 wherein Z is chlorine, W is monocarboxyphenylamino, X is methoxy, Y is methyl, and the carboxy groups in the right-hand benzene ring are both substituted in the meta positions relative to the azo bridge.

4. A dyestuff as defined in claim 1 wherein Z is chlorine, W is monocarboxyphenylamino, X is methoxy, Y is H, and the carboxy groups in the right-hand benzene ring are both substituted in the meta positions relative to the azo bridge.

5. A dyestuff of the formula

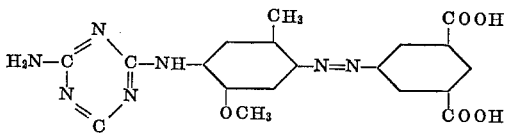

6. A dyestuff of the formula

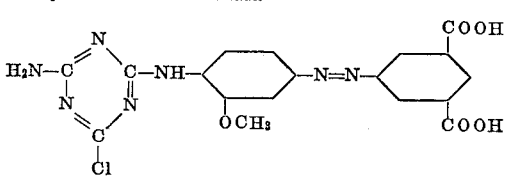

References Cited

FOREIGN PATENTS 227,036 9/1957 Australia.

CHARLES B. PARKER, Primary Examiner.

D. M. PAPUGA, Assistant Examiner.

U.S. Cl. X.R.

8—6.5, 7, 13, 41, 51, 55; 260—207.1

PO-1050
(5/69)

R-407

UNITED STATES PATENT OFFICE
CERTIFICATE OF CORRECTION

Patent No. 3,453,255      Dated July 1, 1969

Inventor(s) NAGIB A. DOSS

It is certified that error appears in the above-identified patent and that said Letters Patent are hereby corrected as shown below:

Column 6, line 40, the "C" substituent in the structural formula should read -- Cl --.

SIGNED AND SEALED
NOV 17 1970

(SEAL)
Attest:

Edward M. Fletcher, Jr.
Attesting Officer

WILLIAM E. SCHUYLER, JR.
Commissioner of Patents